United States Patent
Shouse et al.

(10) Patent No.: US 7,867,418 B2
(45) Date of Patent: Jan. 11, 2011

(54) TOOL AND APPARATUS FOR FORMING A MOLDABLE MATERIAL

(75) Inventors: Douglas Shouse, Shawnee, KS (US);
James M. Suttle, Franklin, TN (US);
Ryan Brown, Kansas City, MO (US);
Mark Harshman, St. Joseph, MO (US)

(73) Assignee: Mars, Incorporated, McLean, VA (US)

( * ) Notice: Subject to any disclaimer, the term of this patent is extended or adjusted under 35 U.S.C. 154(b) by 122 days.

(21) Appl. No.: 11/903,635

(22) Filed: Sep. 24, 2007

(65) Prior Publication Data

US 2009/0079103 A1    Mar. 26, 2009

(51) Int. Cl.
*B28B 7/12* (2006.01)

(52) U.S. Cl. .................. 264/85; 249/122; 249/141; 249/181; 425/345; 425/356; 425/438; 425/DIG. 102

(58) Field of Classification Search .................. 425/345, 425/348 R, 422, 436 R, 438, DIG. 102, 356; 249/63, 122, 141, 176, 181; 264/85
See application file for complete search history.

(56) References Cited

U.S. PATENT DOCUMENTS

| | | | |
|---|---|---|---|
| 1,294,635 A | 2/1919 | Dieterich | |
| 3,272,361 A | 9/1966 | Vogel et al. | |
| 3,409,939 A | 11/1968 | Hey | |
| 3,514,509 A | 5/1970 | Hoffer et al. | |
| 3,660,002 A | 5/1972 | Morroni | |
| 4,126,291 A * | 11/1978 | Gilbert et al. | 249/63 |
| 4,364,895 A | 12/1982 | Underwood | |
| 4,371,329 A | 2/1983 | Steels | |
| 4,531,703 A | 7/1985 | Underwood | |
| 4,578,027 A | 3/1986 | Koppa et al. | |
| 4,620,959 A | 11/1986 | Goto et al. | |
| 4,653,997 A | 3/1987 | Sheffield et al. | |
| 5,106,553 A | 4/1992 | Onisawa et al. | |
| 5,171,585 A | 12/1992 | Onisawa et al. | |
| 5,356,284 A | 10/1994 | Sheffield | |
| 5,490,966 A | 2/1996 | Peterson et al. | |
| 5,683,644 A | 11/1997 | Peterson | |
| 5,932,164 A | 8/1999 | Allen | |
| 5,935,495 A | 8/1999 | Turner et al. | |
| 6,203,751 B1 * | 3/2001 | Rolle et al. | 425/412 |
| 6,238,603 B1 | 5/2001 | Turner et al. | |
| 6,299,431 B1 * | 10/2001 | Neter | 425/526 |
| 6,837,696 B2 * | 1/2005 | Sowden et al. | 425/345 |
| 6,887,066 B2 | 5/2005 | Cerny et al. | |
| 2003/0203063 A1 | 10/2003 | Ano | |

* cited by examiner

*Primary Examiner*—Richard Crispino
*Assistant Examiner*—Thu Khanh T Nguyen
(74) *Attorney, Agent, or Firm*—Christopher D. Brandt; Tracey S. Truitt; Polsinelli Shughart PC (57) ABSTRACT

The present invention is directed to a tool and apparatus for forming a moldable material into a formed product having a desired shape, and optionally having a pouch for inserting pills, vitamins, and the like. The tool comprises a sleeve with a concentric insert, with a gap between the two for directing compressed air to eject the formed product from the tool. Exemplary apparatus using the tool and an associated method are also provided.

16 Claims, 10 Drawing Sheets

TOOL AND APPARATUS FOR FORMING A MOLDABLE MATERIAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to a tool for forming moldable material. More specifically the invention relates to a tool and apparatus for forming moldable material into a formed product having a desired shape either with or without a pouch formed therein, and ejecting the formed product from the tool using compressed air.

Moldable materials are materials that remain soft and pliable during processing, such as clay or dough. In the pet food industry, pet treats or snacks are commonly made from edible moldable materials, the material being formed into a desired shape during processing or manufacturing. For example, the moldable material may be formed into a bone-shape, and/or may be formed with an imprint of the product or manufacturer's name. Certain moldable materials may harden after processing, others may remain pliable throughout their usable life.

Products made from moldable material are typically formed by pressing the moldable material into a tool or mold having the desired shape. After pressing, the formed product is removed from the mold, with the moldable material retaining the shape of the mold. Depending on the type of mold or tool use, the formed product can be removed from the tool by simply dumping the product from the mold, or manually pulling or otherwise removing the product. Removing the formed product from the tool is challenging since the material tends to stick to the mold, resulting in difficult release and/or damage to the molded product. In order to overcome these problems, manufactures have devised various ways to assist the release of the formed product from the mold. For example, the mold may be coated with a release agent that inhibits adhesion between the mold and the moldable material. While a release agent does assist in removing the formed product, it can also leave an undesirable residue on the formed product. Mechanisms using cams, push rods or pistons can be employed to push or pull the formed product from the mold. These mechanisms, however, require direct contact of mechanical components with the formed product, often resulting in damaging or deforming the product.

Air release systems, using a compressed gas to eject the formed product from a mold via air apertures in the mold have likewise had limited success. In a typical mold using an air release system, air apertures in the mold are in direct contact with the formed product. The air apertures thus become easily clogged with material, reducing the effectiveness of the system. Furthermore, the direct contact of the air aperture with the moldable material and the high pressure air burst from the aperture can deform or damage the formed product.

Accordingly, it can be seen that a need remains for a tool capable of forming moldable material into a desired shape, yet allowing easy release of the molded product from the tool without causing damage or deformation.

BRIEF SUMMARY OF THE INVENTION

The present invention is directed to a tool and apparatus for forming a moldable material into a formed product having a desired shape, and for forming a pouch within the moldable material for inserting pills, vitamins, and the like. The tool comprises a sleeve having a bore extending axially therethrough, and an insert comprising a barrel, with a nib extending outwardly from the barrel. An air passage in the insert connects an air inlet on the head of the insert to an air outlet on the surface of the barrel to direct compressed air to the air outlet. With the insert concentrically mated within the sleeve, a gap is defined between the insert and the sleeve, allowing compressed air exiting from the air outlet to flow through the gap and out the sleeve. The sleeve and insert may be any desired shape so long as a gap is defined between the sleeve and insert. In use, a moldable material is pressed into the tool, around the nib and against the barrel to form a formed product having a pouch therein. With the product thus formed, a burst of compressed air is directed into the gap to eject the formed product from the tool.

An apparatus for manufacturing high-volumes of formed products includes a wheel having a plurality of receptacles configured to receive molding tools as described above. The wheel rotates the tools past a supply of moldable material, which is pressed into each tool. The formed product is ejected from each tool using compressed air, and the wheel rotates the tools back to the moldable material supply to repeat the process.

Additional aspects of the invention, together with the advantages and novel features appurtenant thereto, will be set forth in part in the description which follows, and in part will become apparent to those skilled in the art upon examination of the following, or may be learned from the practice of the invention. The advantages of the invention may be realized and attained by means of the instrumentalities and combinations particularly pointed out in the appended claims.

DETAILED DESCRIPTION OF EXEMPLARY EMBODIMENTS

First Exemplary Embodiment

Referring to FIGS. 1-4, a tool in accordance with a first exemplary embodiment of the present invention is designated generally by the numeral 10. Tool 10 comprises a sleeve 12 and an insert 14, with insert 14 configured to mate with sleeve 12 as will be explained in more detail below.

Figure 1:
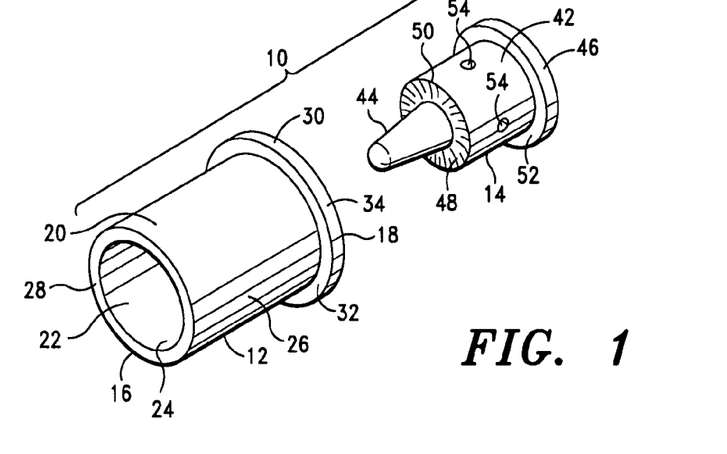
FIG. 1 is a perspective, exploded view of a tool in accordance with a first exemplary embodiment of the present invention.

Looking to FIG. 1, sleeve 12 extends from a first end 16 to a second end 18, and comprises a barrel 20 having a bore 22 extending axially therethrough such that barrel 20 comprises an inner surface 24 and an outer surface 26, with a wall 28 therebetween. Lip 30 extends outwardly from, and circumferentially around, barrel 20 at second end 18 of the sleeve, with undersurface 32 transitioning between the outer surface 26 of barrel 20 and the outer surface 34 of lip 30.

Figure 2A:
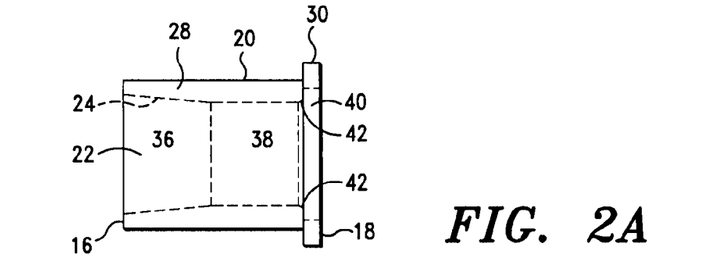
FIG. 2A is a front view of the sleeve portion of the tool of FIG. 1.
Figure 2B:
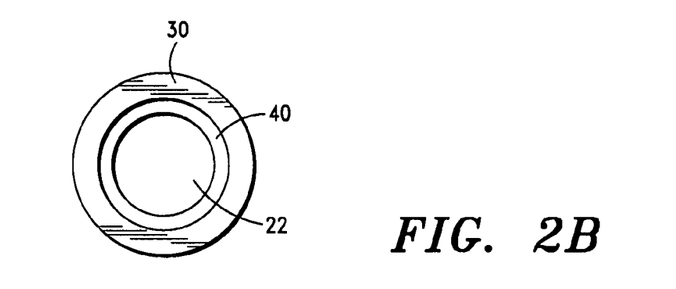
FIG. 2B is a right-side view of the sleeve portion of the tool of FIG. 1.
Figure 2C:
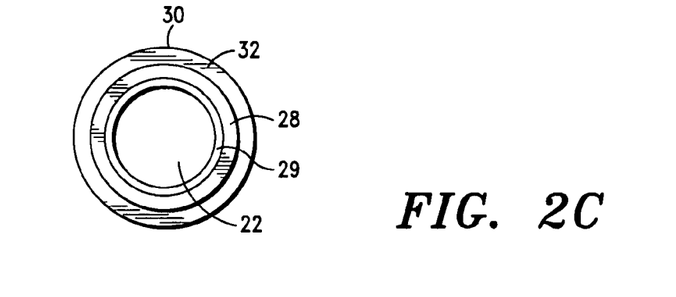
FIG. 2C is a left-side view of the sleeve portion of the tool of FIG. 1.

Looking to FIGS. 2A, 2B, and 2C, it can be seen that the diameter of bore 22 varies, tapering from a larger diameter at first end 16 to a smaller diameter at approximately the midpoint of barrel 20, then substantially maintaining that smaller diameter between the midpoint of barrel 20 and second end 18. Thus, as seen in FIG. 2A, in cross-sectional view, the inner surface 24 of barrel 20 forms a tapered region 36 between first end 16 and approximately the midpoint of barrel 20, and forms a parallel region 38 between approximately the midpoint and the second end 18 of barrel 20. As also seen in FIGS. 2A, 2B, and 2C, lip 30 includes a recessed area 40 concentric with, and greater in diameter than, bore 22, with a chamfered surface 42 transition between bore 22 and the recessed area 40.

Looking back to FIG. 1, insert 14 comprises a barrel 42 with a nib 44 projecting outwardly from a first end of barrel 42 and a head 46 extending outwardly from, and circumferentially around, a second end of barrel 42. As will be described in more detail hereinbelow, the diameter of barrel 42 is less than the diameter of the smaller-diameter, parallel region, portion of bore 22 of sleeve 12, and the diameter of head 46 is slightly less than the diameter of recessed area 40 in sleeve 12 so that barrel 42 and head 46 will fit within bore 22 and recessed area 40, respectively, of sleeve 12. Nib 44 tapers from a larger diameter at its juncture with barrel 42 to a smaller diameter at its tip. The juncture between nib 44 and barrel 42 comprises a concave surface 48, with the juncture of concave surface 48 and the outer perimeter of barrel 42 forming a sharp edge 50. As will be explained in more detail hereinbelow, the undersurface 52 of head 46 provides a seating surface for supporting and placing the insert. Four air outlet apertures 54 (two visible in this view) are evenly spaced around the circumference of barrel 42, approximately at the midpoint between the first and second ends of barrel 42.

Figure 3A:
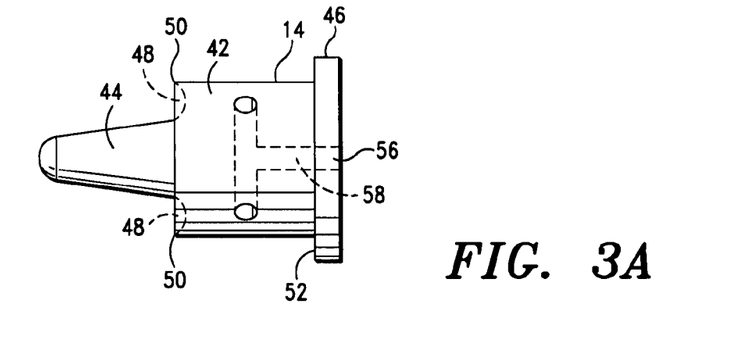
FIG. 3A is a front view of the insert portion of the tool of FIG. 1.
Figure 3B:
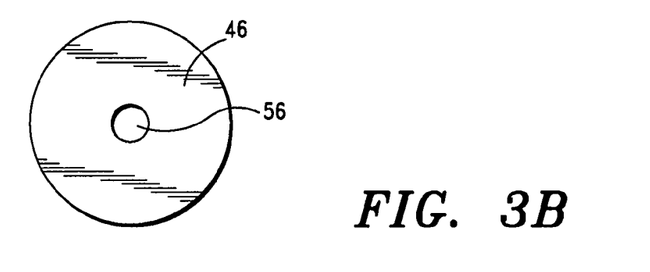
FIG. 3B is a right-side view of the insert portion of the tool of FIG. 1
Figure 3C:
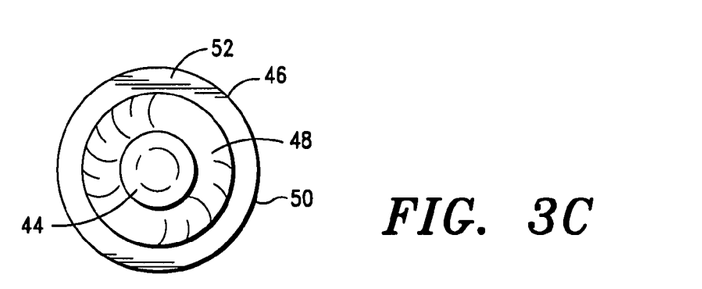
FIG. 3C is a left-side view of the insert portion of the tool of FIG. 1

Looking to FIGS. 3A, 3B, and 3C, insert 14 further comprises an air inlet aperture 56 in head 46, with an internal air passage 58 providing fluid communication between the inlet aperture 56 and the outlet apertures 54 such that compressed air introduced into inlet aperture 56 flows through air passage 58 to outlet apertures 54.

Figure 4:
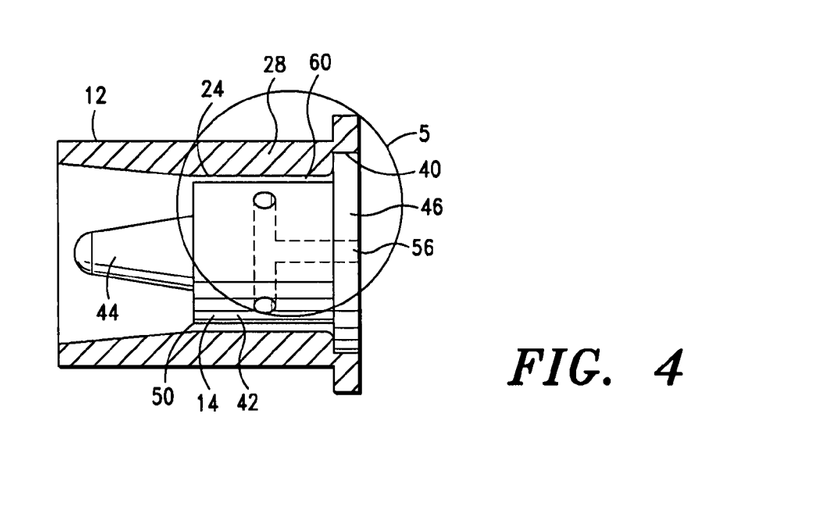
FIG. 4 is a cross-sectional view of the mated sleeve and insert of the tool of FIG. 1.
Figure 5:
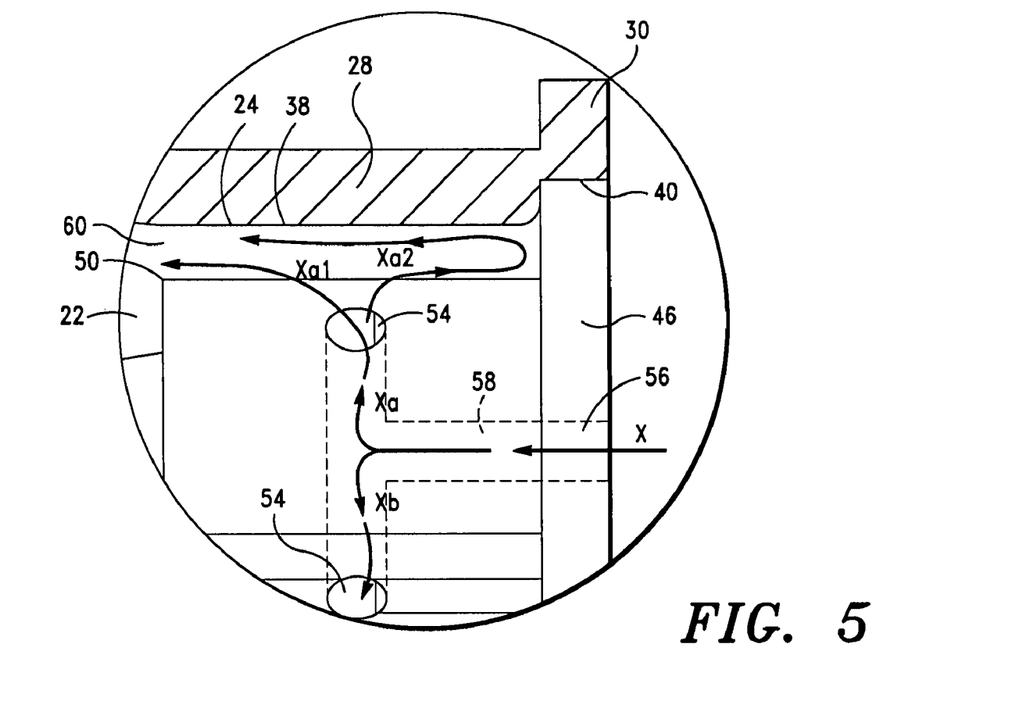
FIG. 5 is a close-up view of a portion of the tool of FIG. 4.

Turning now to FIGS. 4 and 5, sleeve 12 and insert 14 are shown mated together, with the nib 44 and barrel 42 of the insert extending into the bore 22 of sleeve 12, and head 46 of the insert fitting within recessed area 40 of the sleeve, with undersurface 52 seating against the shelf formed by the recessed area 40. Head 46 mates snugly within the recessed area to hold the insert aligned axially with the sleeve, with the mating of undersurface 52 with the shelf of recessed area 40 providing a seal between the insert and the sleeve. With the sleeve and insert thus mated, a gap 60 is defined between the parallel wall portion 38 of inner surface 24 of sleeve 12 and the outer surface of barrel 42 of insert 14. Looking to the close-up view of the gap in FIG. 5, with the sleeve 12 and insert 14 mated, the arrangement of the air outlet apertures 54 with respect to gap 60 allows pressurized air to be introduced to the tool through air inlet aperture 56, exiting the tool through gap 60. As shown in FIG. 5, air flows into the inlet aperture 56, as indicated by line x, through air passage 58 to each of the outlet apertures 54, as indicated by lines $x_a$ and $x_b$. As the air exits the outlet aperture 54 into the gap 60, some of the air will take a direct route to exit the tool via the open end of bore 22 as indicated by line $x_{a1}$, while some air will first flow to the closed end of gap 60 then reflect back out towards the open end of bore 22 as indicated by line $x_{a2}$. Of course, the actual air flow will be a mixture of direct and indirect flow around barrel 42 and through gap 60, out towards the open end of bore 22. Thus, air directed into inlet aperture 56 will flow thorough air passage 58 and out each of the air outlet apertures 54, with the air then directed out through bore 22 at the first end 16 of sleeve 12. With multiple air outlet apertures 54 distributed around the perimeter of barrel 42 of insert 14, the air thus exits through the gap 60 as a concentric ring encircling barrel 42.

Preferably, sleeve 14 and insert 12 are made of a strong rigid material suitable for food handling operations, such as plastic or steel. Most preferably, they are made of stainless steel. While specific configurations and arrangements are shown in the exemplary embodiment, other configurations are within the scope of the present invention. For example, while four air outlet apertures are described as being evenly spaced around the barrel, more or fewer outlet apertures may be employed, or may be unevenly spaced, without deviating from the presenting invention. Likewise, more than one air inlet aperture may be used, or various combinations of air inlets and outlets may be used. Additionally, while the barrel 42 of insert 14 is shown as being substantially smooth, grooves or channels may be formed in the surface to facilitate air flow around the barrel. Or, the seal between insert 14 and sleeve 12 may be augmented by the use of an O-ring between the mating surfaces on those parts. These and other variations are anticipated by the present invention.

With the structure of tool 10 set forth, the operation of the tool will now be described. Looking to FIGS. 4 and 5, in use, insert 14 and sleeve 12 are mated together as described above. Insert 14 may be held in place with the sleeve by placing a cover or barrier over the second end 18 of sleeve 12, or head 46 of insert 14 can be adhered within the recessed area 40 of the sleeve. Or, insert 14 and sleeve 12 can be configured with mating or interlocking fasteners, such as threads or screws. Preferably, insert 14 is removably affixed to sleeve 12 so that the tool may be disassembled for cleaning and/or disinfecting.

With the insert and sleeve mated as just described, moldable material is pressed into the open end of bore 22 at the first end 16 of sleeve 12. The moldable material is forced down, around nib 44, to concave surface 48, filling the entire void area in bore 22 and forming the moldable material around nib 44. Preferably the moldable material has a clay or dough-like consistency, such that the viscosity of the material does not allow the material to flow into the relatively narrow gap 60. Excess moldable material external to the tool is then removed, preferably by scraping or slicing the material flush with the first end 16 of sleeve 12. The sharp edge 50 at the juncture of barrel 42 and concave surface 48 of insert 14 provides a clean break point for the moldable material forced against the concave surface 48.

With the moldable material thus pressed into the tool and the excess material removed, the formed product is in the tool, ready to be ejected. A burst of pressurized air directed into the air inlet aperture results in a concentric ring of air being directed out of gap 60 (as described above), against the formed product, which cleanly ejects the formed product from the tool. The concentric-ring application of air distributes the ejection air nearly uniformly around the perimeter of the formed product so that no one area of the formed product is subject to excessive air pressure, minimizing the chance of damage to the formed product. The burst of concentric air also ejects any moldable material residue from gap 60 to keep the air outlet apertures free from blockage by bits of moldable material. The tapered region 38 of bore 22 additionally urges the formed product to be easily ejected from the tool. While any compressed gas may be used to eject the formed product, preferably compressed air, having a pressure in the range of approximately 8 to 12 pounds per square inch, is used. The placement of multiple air outlet apertures 54 around the perimeter of barrel 42 of insert 14 allows air to flow around the entirety of gap 60 even if one or more of the air outlet apertures is blocked. Thus, so long as at least one air outlet aperture remains unblocked, gap 60 will direct the air into a concentric ring as described above.

As is apparent from the shape of the insert 14 and sleeve 12, the formed product will be generally cylindrical in shape, with a pouch formed therein by the nib 44 of the insert. The pouch allows a second product to then be placed into the formed product, while the malleable consistency of the moldable material allows the pouch to then be closed by pressing opposing edges of the open pouch together. Thus, the formed product, having a pouch formed therein, is ideal for placing, for example, pills or medicine into a dog treat product.

Of course, other variations are contemplated by the present invention. For example, while insert 14 is shown with a protruding nib 44, the insert could likewise have no protruding nib, allowing the tool to form a generally cylindrical formed product without a pouch. Or, the sleeve and insert could have a shape other than a circle, such as a star, square, dog-bone, or fish-shape. So long as the sleeve and insert can be aligned along an axis to maintain a gap between the two, the shape of the sleeve and insert can be varied as desired to produce a formed product of a desired shape. Or, a protruding nib having a different shape could be used to form a correspondingly shaped pouch in the formed product. In addition, the molding process could include placing a pill or other product into the tool prior to pressing the moldable material into the tool, thus forming the formed product around the pre-inserted pill. These and other variations are contemplated by, and within the scope of, the present invention.

Second Exemplary Embodiment

Referring to FIGS. 6-9, a tool in accordance with a second exemplary embodiment of the present invention is designated generally by the numeral 110. Tool 110 comprises a sleeve 112 and an insert 114, with insert 114 configured to mate with sleeve 112 in a manner similar to that described above with respect to the first exemplary embodiment.

Figure 6:
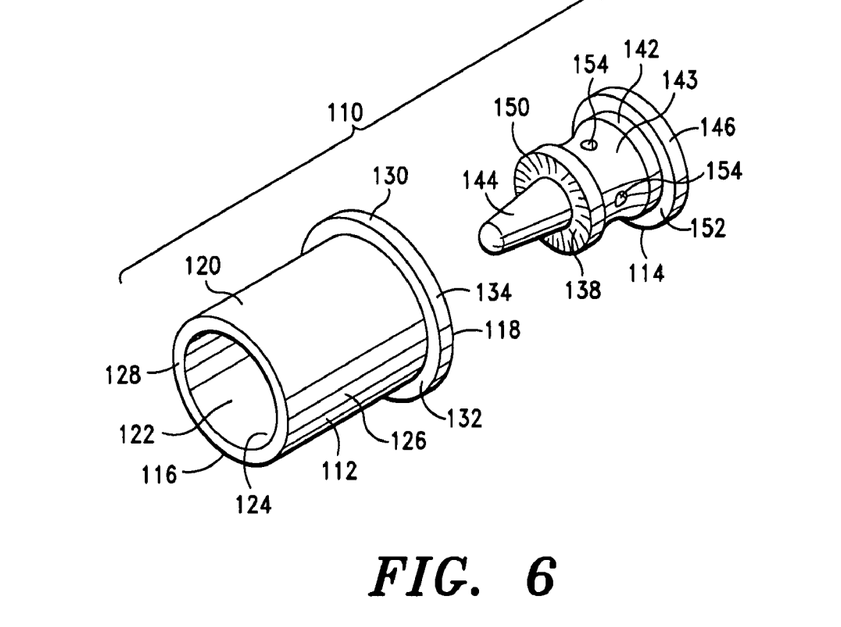
FIG. 6 is an exploded, perspective view of a tool in accordance with a second exemplary embodiment of the present invention.

As will be apparent, sleeve 112 is identical to the sleeve described above with respect to the first exemplary embodiment. Sleeve 112 extends from a first end 116 to a second end 118, and comprises a barrel 120 having a bore 122 extending axially therethrough such that barrel 120 comprises an inner surface 124 and an outer surface 126, with a wall 128 therebetween. Lip 130 extends outwardly from, and circumferentially around, barrel 120 at second end 118 of the sleeve, with undersurface 132 transitioning between the outer surface 126 of barrel 120 and the outer surface 134 of lip 130.

Insert 114 comprises a barrel 142 with a nib 144 projecting outwardly from a first end of barrel 142 and a head 146 extending outwardly from, and circumferentially around, a second end of barrel 142. A concave indentation 143 extends around the center portion of barrel 142, such that in cross-sectional view, the barrel appears hour-glass shaped. The diameter of barrel 142 is less than the diameter of the smaller-diameter portion of bore 122 of sleeve 112, and the diameter of head 146 is slightly less than the diameter of recessed area 140 in sleeve 112 so that barrel 142 and head 146 will fit within bore 122 and recessed area 140, respectively, of sleeve 112. Nib 144 tapers from a larger diameter at its juncture with barrel 142 to a smaller diameter at its tip. The juncture between nib 144 and barrel 142 comprises a concave surface 148, with the juncture of concave surface 148 and the outer perimeter of barrel 142 forming a sharp edge 150. The undersurface 152 of head 146 provides a seating surface for supporting and placing the insert. Four air outlet apertures 154 (two visible in this view) are evenly spaced around the circumference of barrel 142 in the concave indentation 143 portion, approximately at the midpoint between the first and second ends of barrel 142.

Figure 7A:
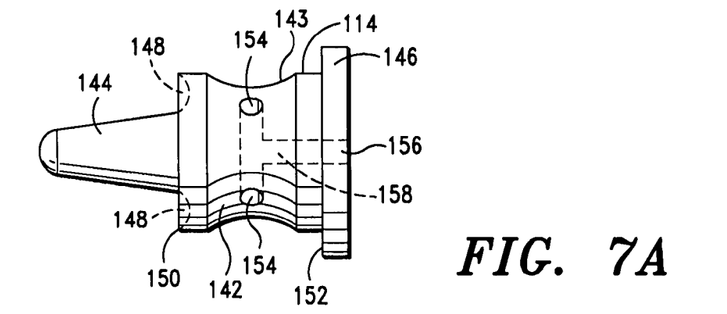
FIG. 7A is a front view of the insert portion of the tool of FIG. 6.
Figure 7B:
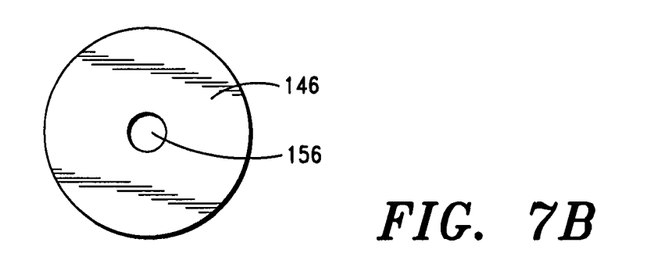
FIG. 7B is a right-side view of the insert portion of the tool of FIG. 6
Figure 7C:
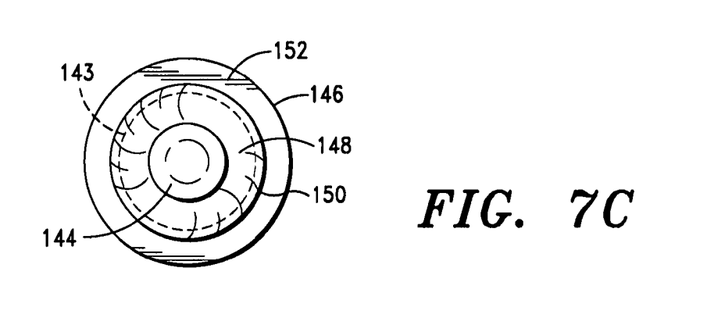
FIG. 7C is a left-side view of the insert portion of the tool of FIG. 6

Looking to FIGS. 7A, 7B, and 7C, insert 114 further comprises an air inlet aperture 156 in head 146, with an internal air passage 158 providing fluid communication between the inlet aperture 156 and the outlet apertures 154 such that compressed air introduced into inlet aperture 156 flows through air passage 158 to outlet apertures 154.

Figure 8:
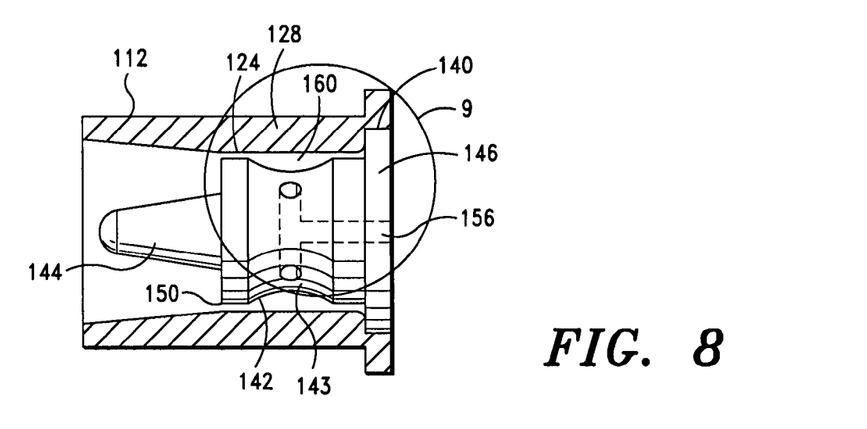
FIG. 8 is a cross-sectional view of the mated sleeve and insert of the tool of FIG. 6.
Figure 9:
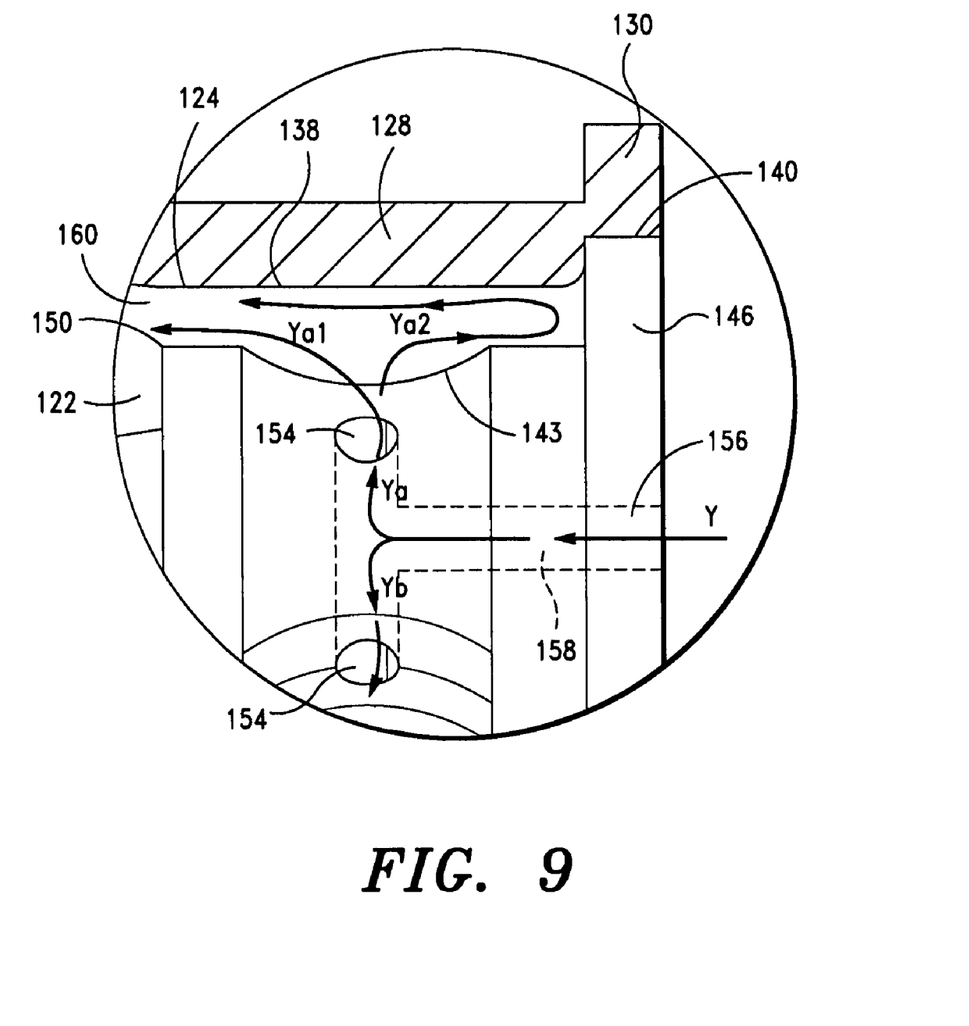
FIG. 9 is a close-up view of a portion of the tool of FIG. 8.
Figure 10:
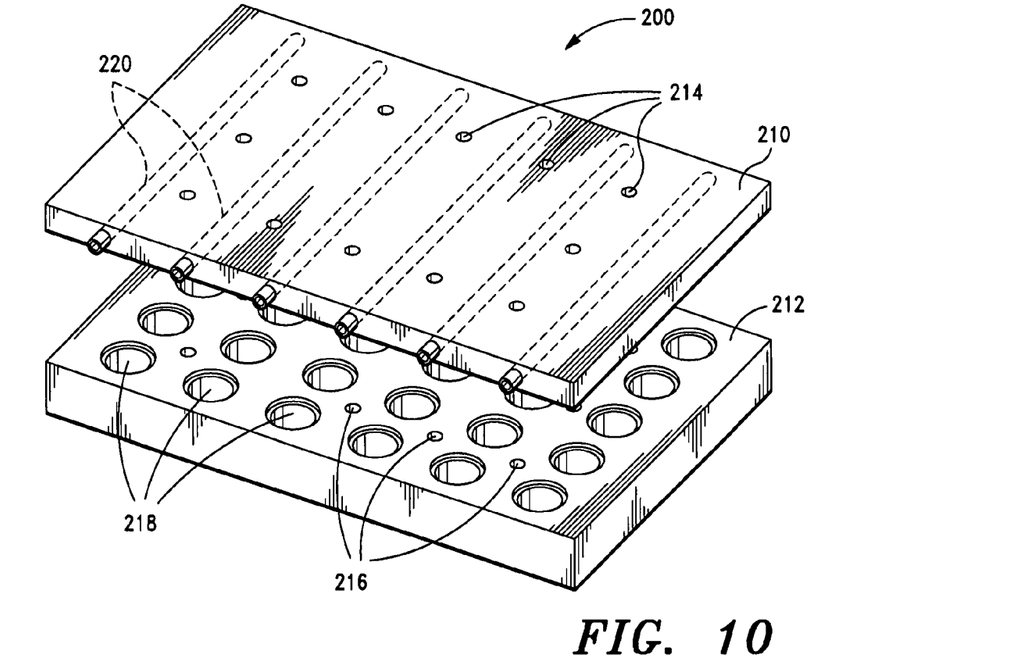
FIG. 10 is a perspective view of an apparatus in accordance with a third exemplary embodiment of the present invention.

Turning now to FIGS. 8 and 9, sleeve 112 and insert 114 are shown mated together, with the nib 144 and barrel 142 of the insert extending into the bore 122 of sleeve 112, and head 146 of the insert fitting within recessed area 140 of the sleeve, with undersurface 152 seating against the shelf formed by the recessed area 140. Head 146 mates snugly within the recessed area to hold the insert aligned axially with the sleeve, with the mating of undersurface 152 with the shelf of recessed area 140 providing a seal between the insert and the sleeve. With the sleeve and insert thus mated, a gap 160 is defined between the wall of sleeve 112 and the outer surface of barrel 142 of insert 114. Looking to the close-up view of the gap in FIG. 9, with the sleeve 112 and insert 114 mated, the arrangement of the air outlet apertures 154 with respect to gap 160 allows pressurized air to be introduced to the tool through air inlet aperture 156, exiting the tool through gap 160. As shown in FIG. 9, air flows into the inlet aperture 156, as indicated by line y, through air passage 158 to each of the outlet apertures 154, as indicated by lines $y_a$ and $y_b$. As the air exits the outlet aperture 154 into the gap 160, some of the air will take a direct route to exit the tool via the open end of bore 122 as indicated by line $y_{a1}$, while some air will first flow to the closed end of gap 160 then reflect back out towards the open end of bore 122 as indicated by line $y_{a2}$. Of course, the actual air flow will be a mixture of direct and indirect flow around barrel 142 and through gap 160, out towards the open end of bore 122. Thus, air directed into inlet aperture 156 will flow thorough air passage 158 and out each of the air outlet apertures 154, with the air then directed out through bore 122 at the first end 116 of sleeve 112. With multiple air outlet apertures 154 distributed around the concave indentation 143 portion of barrel 142 of insert 114, the air thus exits through the gap 160 as a concentric ring encircling barrel 142.

In use, the tool operates similarly to the tool described above with respect to the first exemplary embodiment with respect to the moldable material being pressed into, and ejected from, the tool. Likewise, the sleeve and insert are mated as described above, and the preferably materials and variations are as described above with respect to the first exemplary embodiment. Concave indentation 143, around the center portion of barrel 142, provides separation between air outlet apertures 154 and the wall 128 of the sleeve 112. Thus, the air outlet apertures are less susceptible to becoming jammed or contaminated with debris, as any debris entering the gap 160 can fill the space provided by concave indentation 143 without impeding the air flow from the air outlet apertures 154. Concave indentation 143 thus provides a large area through which air exiting from the air outlet apertures can travel around the insert 114 to provide a concentric ring of compressed air out of gap 160 as described above.

As described above with respect to the first exemplary embodiment, variations in the shape of the sleeve and insert to form a product of a desired shape, and inclusion or exclusion of the nib on the insert to include or exclude a formed pocket, are within the scope of the present invention.

Third Exemplary Embodiment

Looking to FIGS. 10-14, an apparatus in accordance with a third exemplary embodiment of the present invention is depicted generally by the numeral 200. The apparatus 200 is configured to accept a plurality of tools as described above with respect to the first and second exemplary embodiments, for semi-automatic, volume manufacture of multiple formed products using the tools as described above.

Looking to FIGS. 10-14, apparatus 200 comprises a top plate 210 and a bottom plate 212, each having fastener apertures 214, 216 allowing the two plates to be joined using a plurality of fasteners such as screws or bolts. Bottom plate 212 comprises a plurality of receptacles 218, arranged in rows and columns, configured to receive the sleeve of a tool as described above with respect to the first and second exemplary embodiments. Top plate 210 includes a plurality of air channels 220, each air channel corresponding to a column of receptacles on bottom plate 212.

Figure 11:
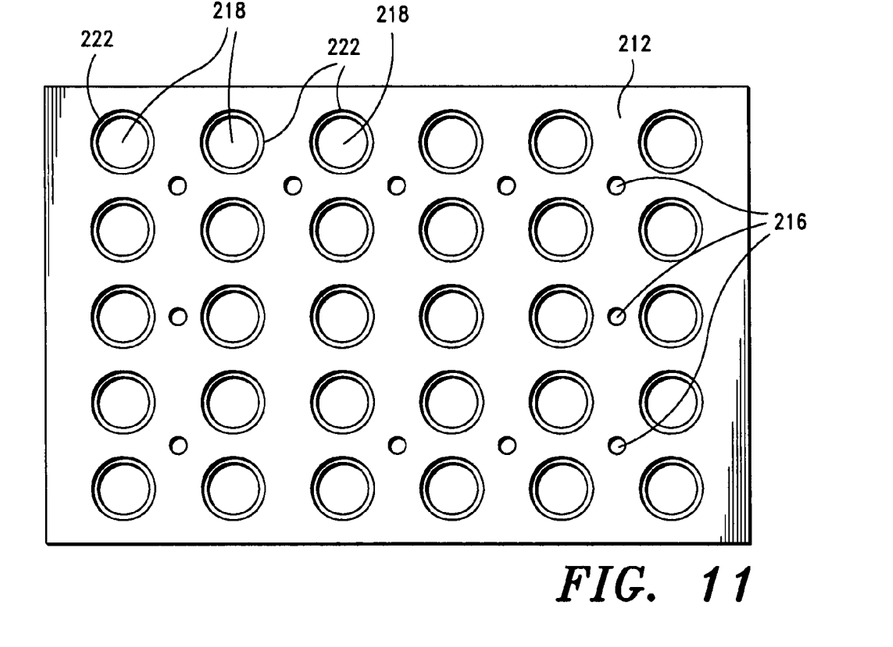
FIG. 11 is a plan view of the tray portion of the apparatus of FIG. 10.
Figure 12:
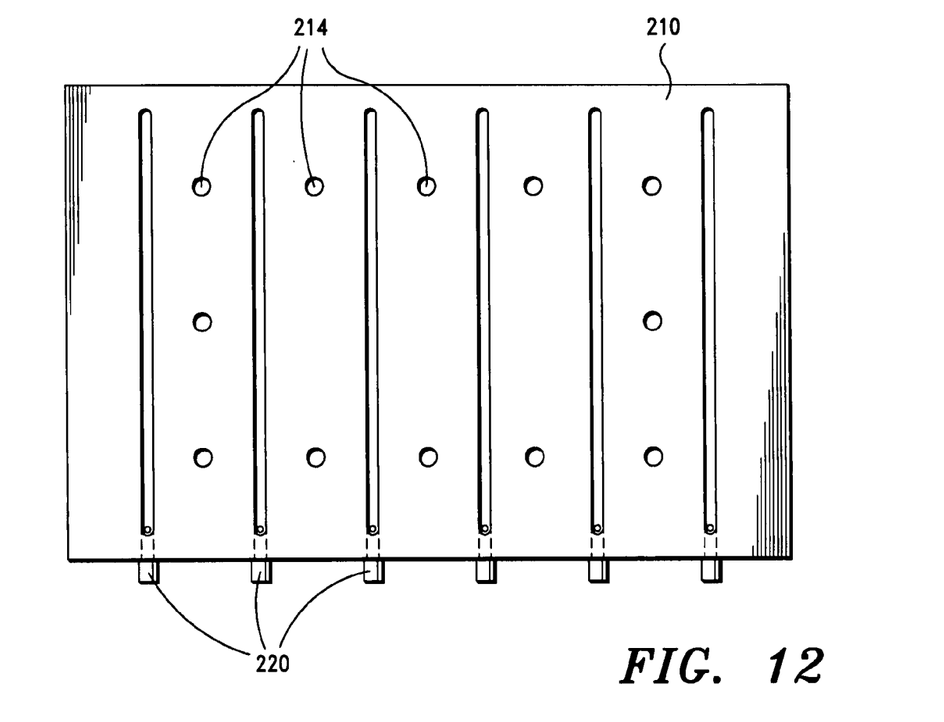
FIG. 12 is a plan view of the plenum of the apparatus of FIG. 10.
Figure 13:
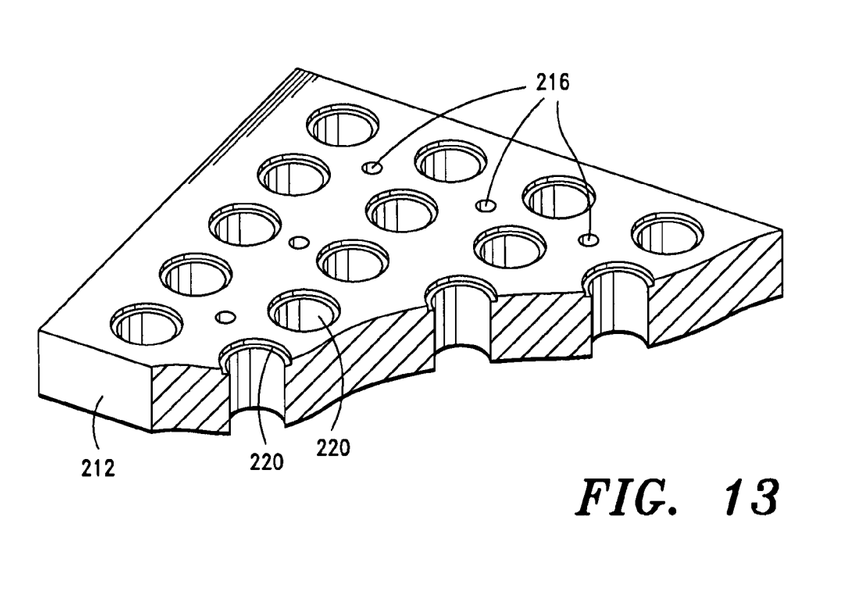
FIG. 13 is a cut-away view of the tray portion of the fixture of FIG. 10.
Figure 14:
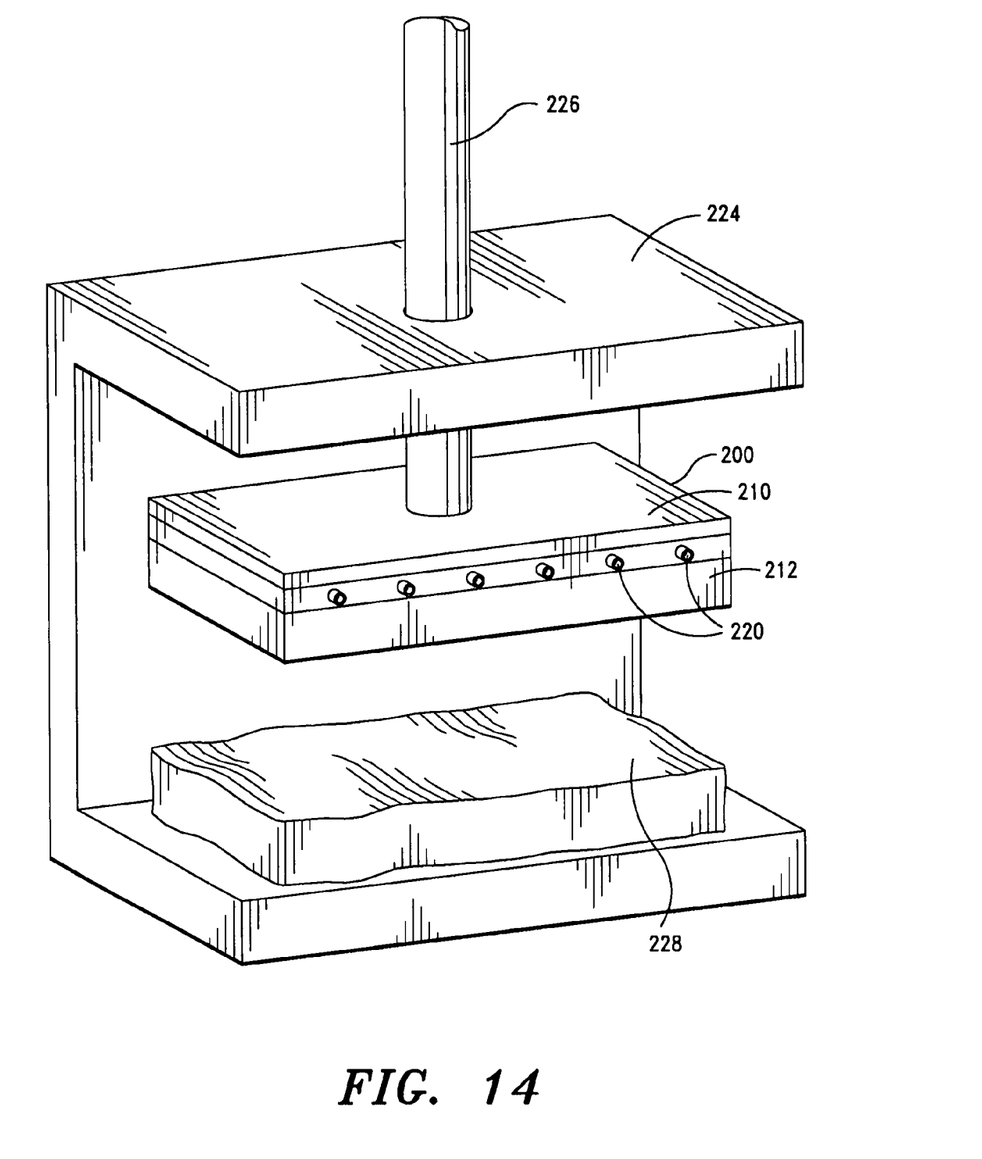
FIG. 14 is a perspective view of a press in accordance with an exemplary embodiment of the present invention configured with the tool fixture of FIG. 10.

As shown best in FIG. 11, each receptacle 218 includes a shelf 222 configured to mate with the lip on the sleeve of the tools as described in the first and second exemplary embodiments above.

In operation, each of the receptacles 218 of bottom plate 212 is loaded with a tool comprising a sleeve and insert, as described above with respect to the first and second exemplary embodiments. Top plate 210 is then attached to the bottom plate 212, trapping the tools therebetween. Air channels 220 align with the columns of tools to allow a burst of compressed air applied to a particular air channel to simultaneously be directed to all of the tools within that column through the air inlet apertures on the tools, as described above. With the apparatus 200 mounted to a movable ram 226 of a fixture 224, the entire apparatus is pressed into a bed of moldable material 228 positioned beneath the apparatus. Thus, each of the plurality of tools mounted in the apparatus is simultaneously loaded with moldable material. Upon withdrawing the apparatus, excess material may be scraped off, if necessary. Then, each column of formed products is ejected by applying compressed air to the air channel 220 on top plate 210 corresponding to that column. The air in the air channels is directed into the air inlet aperture of the tool, causing the formed product to eject from the tools as describe above. Air may be direct to each air channel in succession, or simultaneously if a large enough supply or volume of air is available.

Of course, other configurations and variations of the apparatus are contemplated by the present invention. For example, the number of rows and columns of tools may be varied, or the arrangement of the air channels may be changed. These and other modifications to the embodiment shown are within the scope of the present invention.

Fourth Exemplary Embodiment

Figure 15:
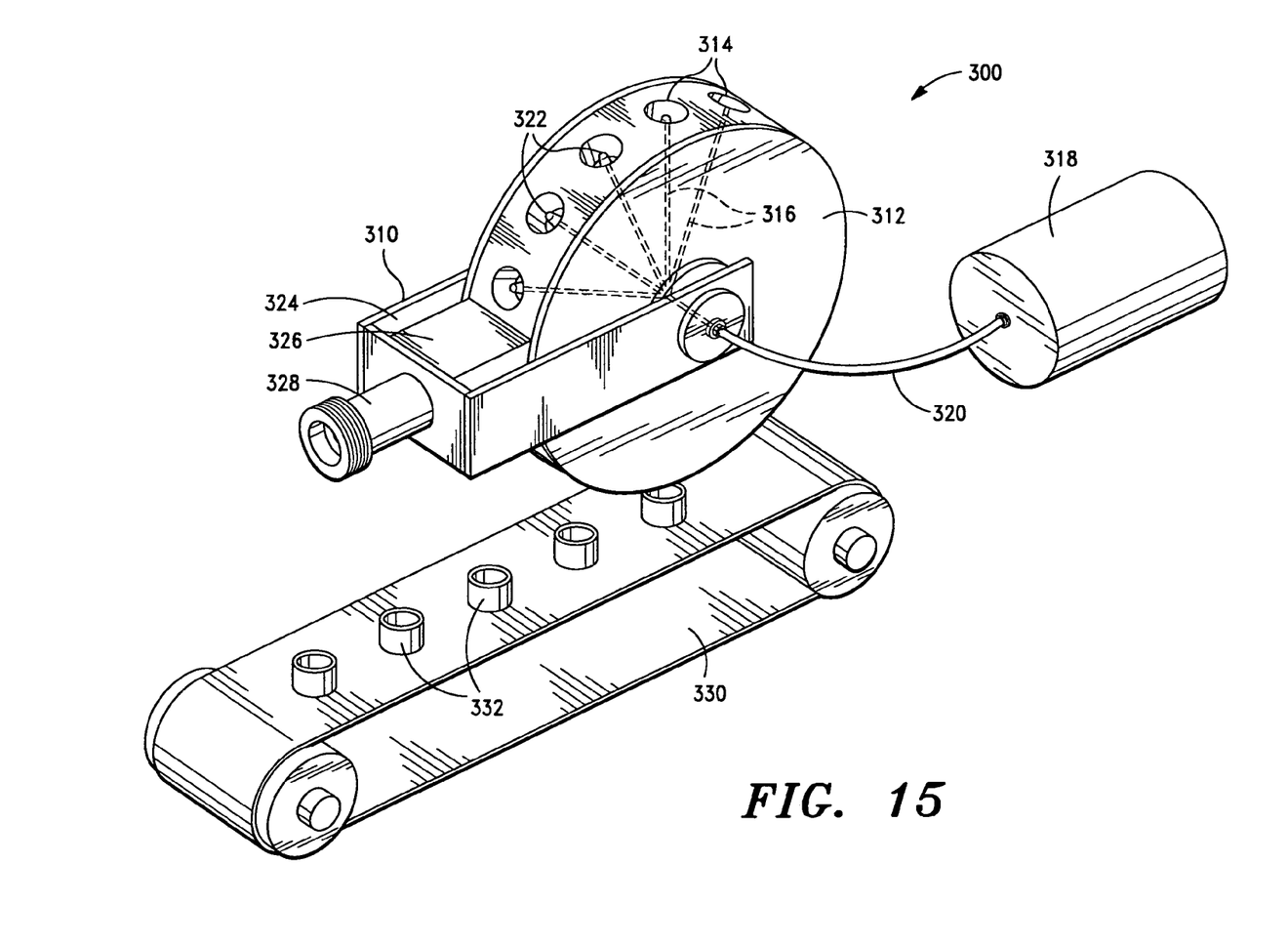
FIG. 15 is a perspective view of an apparatus in accordance with a fourth exemplary embodiment of the present invention.

Looking to FIG. 15, an apparatus in accordance with a fourth exemplary embodiment of the present invention is depicted generally by the numeral 300. The apparatus 300 is configured to accept a plurality of tools as described above with respect to the first and second exemplary embodiments, for automatic, high-volume manufacture of multiple formed products using the tools as described above.

Apparatus 300 comprises a fixture 310 supporting a wheel assembly 312. Wheel assembly 312 includes a plurality of receptacles 322 around its circumference, each receptacle configured to accept a tool comprising a sleeve and insert as described above with respect to the first and second exemplary embodiments. The receptacles are configured to hold the tools such that the open end of the tool points outwardly, substantially flush with the surface of the wheel 312. Air channels 316 associated with each tool connect to a compressed-air supply 318 via hose 320, through the hub of wheel 312. A material bin 324 provides a supply of moldable material 326 for pressing, via cylinder 328, into a tool aligned with the cylinder.

In operation, wheel 312 rotates continuously. As a particular tool aligns with cylinder 328, moldable material from bin 324 is pressed into the tool. As the tool rotates away from the material bin and towards conveyor 330, excess material is scraped from the end of the tool and remains in the bin. When the tool is directly over the conveyor 330, a burst of compressed air is directed to the tool, ejecting the formed product 332 onto the conveyor for delivery to packaging or further processing. The tool then rotates back around until it is again refilled, and the process repeats. As can be seen, the wheel apparatus provides a continuous, high volume manufacturing process for use with the tools as described above with respect to the first and second embodiments. As long as material is available to fill the tools, the apparatus allows continuous production of formed products.

Of course, the filling of the tools and sequencing of directing air to eject the formed products may be varied without deviating from the present invention. Various methods of supplying a continuous supply of moldable material, and computerized control and sequencing of the ejection air supply will be apparent to those skilled in the art, and are contemplated by the present invention.

Fifth Exemplary Embodiment

Figure 16:
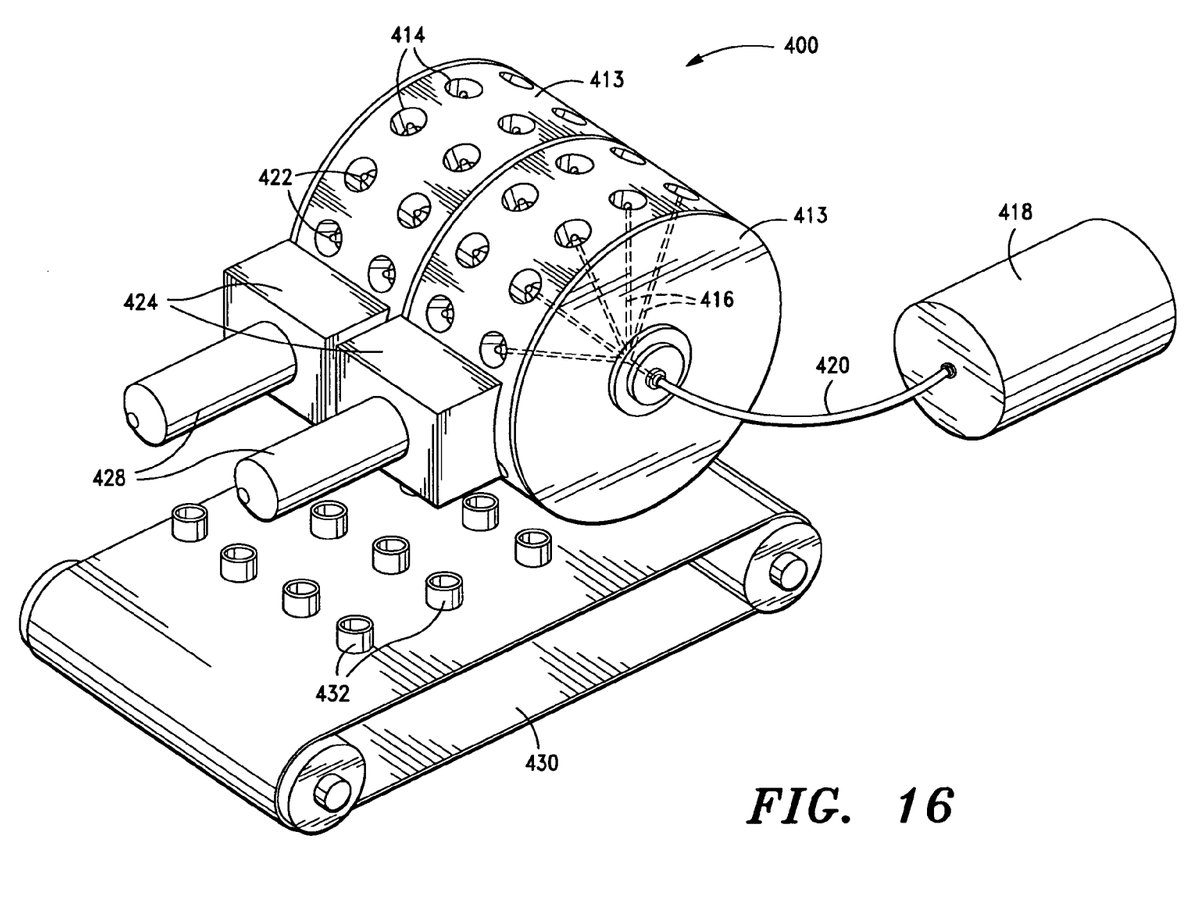
FIG. 16 is a perspective view of an apparatus in accordance with a fifth exemplary embodiment of the present invention.

Looking to FIG. 16, an apparatus in accordance with a fourth exemplary embodiment of the present invention is depicted generally by the numeral 400. The apparatus is a multi-lane variation of the wheel apparatus described above with respect to the fourth exemplary embodiment. Apparatus 400 is configured to accept a plurality of tools as described above with respect to the first and second exemplary embodiments, for automatic, extremely high-volume manufacture of multiple formed products using the tools of the first and second exemplary embodiments as described above.

Apparatus 400 comprises a plurality of wheel assemblies 413, each wheel assembly including two rows of receptacles around the circumference of the wheel, each row having a plurality of receptacles configured to accept a tool comprising a sleeve and insert as described above with respect to the first and second exemplary embodiments. The receptacles are configured to hold the tools such that the open end of the tool points outwardly, substantially flush with the surface of the wheel 413. Air channels 416 associated with each tool connect to a compressed-air supply 418 via hose 420, through the hub of the wheels 413. A material supply area 424 provides a supply of moldable material for pressing into a tool aligned with the cylinder.

In operation, wheels 413 rotate continuously. As a particular tool aligns with its associated material supply area 424, moldable material is pressed into the tool. As the tool rotates away from the material supply area and towards conveyor 430, excess material is scraped from the end of the tool. When the tool is positioned over the conveyor 430, a burst of compressed air is directed to the tool, ejecting the formed product 432 onto the conveyor for delivery to packaging or further processing. The tool(s) then rotates back around until it is again refilled, and the process repeats. As can be seen, the multi-lane wheel apparatus provides a continuous, high volume manufacturing process for use with the tools as described above with respect to the first and second embodiments. As long as material is available to fill the tools, the apparatus allows continuous production of formed products.

Of course, the filling of the tools and sequencing of directing air to eject the formed products may be varied without deviating from the present invention. Various methods of supplying a continuous supply of moldable material, and computerized control and sequencing of the ejection air supply will be apparent to those skilled in the art, and are contemplated by the present invention.

From the foregoing it will be seen that this invention is one well adapted to attain all ends and objectives herein above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

The term "substantially" or "approximately" as used herein may be applied to modify any quantitative representation which could permissibly vary without resulting in a change in the basic function to which it is related. For example, barrel 42 of insert 14 is described as being substantially smooth, but may permissibly vary from smooth if the variance does not materially alter the capability of the invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A tool for forming moldable material, comprising:
a sleeve having a first end, a second end, and a bore extending axially therebetween; and
an insert configured to concentrically mate with said sleeve such that a gap is defined between said sleeve and said insert, wherein said insert comprises a barrel portion having at least one air outlet aperture configured to direct air into said gap,
wherein said insert comprises a nib extending from said barrel, said nib configured to form a pouch within a moldable material pressed into said tool, and
said insert comprises a concave area between said barrel and said nib, said concave area defining a sharp edge around a perimeter of said barrel at its juncture with said concave area.

2. The tool of claim 1, wherein said insert further comprises an air inlet aperture in communication with said air outlet aperture, said air inlet aperture accessible from an exterior of said tool.

3. The tool of claim 1, wherein said bore comprises a tapered region and a parallel region.

4. The tool of claim 1, wherein said air outlet aperture comprises a plurality of air outlet apertures.

5. The tool of claim 4, further comprising a channel connecting said air outlet apertures.

6. A tool for forming moldable material, comprising:
a sleeve having a first end, a second end, and a bore extending axially therebetween;
an insert configured to concentrically mate with said sleeve such that a gap is defined between said sleeve and said insert, wherein said insert comprises a barrel portion having at least one air outlet aperture configured to direct air into said gap, and
a concave area in an outer surface of said barrel, said concave area extending around a circumference of said barrel.

7. The tool of claim 6, wherein said air outlet is positioned in a trough of said concave area.

8. A tool for forming moldable material, comprising:
a sleeve having a first end, a second end, and a bore extending axially therebetween;
an insert comprising a barrel having a plurality of air outlet apertures, said insert configured to concentrically mate with said sleeve such that a gap is defined between said sleeve and said barrel; and
a nib protruding from said barrel, said nib configured to form a pouch in a moldable material pressed into said tool,
wherein said barrel comprises a trough extending around a perimeter of said barrel, and wherein said air outlet apertures are positioned within said trough.

9. The tool of claim 8, wherein said insert comprises a concave surface between said barrel and said nib.

10. A method of forming moldable material, comprising:
providing a tool according to claim 1;

pressing a moldable material into said tool to form a formed product; and ejecting said formed product from said tool using compressed air.

11. The tool of claim 6, wherein said insert further comprises an air inlet aperture in communication with said air outlet aperture, said air inlet aperture accessible from an exterior of said tool.

12. The tool of claim 6, wherein said bore comprises a tapered region and a parallel region.

13. The tool of claim 8, wherein said insert further comprises an air inlet aperture in communication with said air outlet aperture, said air inlet aperture accessible from an exterior of said tool.

14. The tool of claim 8, wherein said bore comprises a tapered region and a parallel region.

15. A method of forming moldable material, comprising:
providing a tool according to claim 6;
pressing a moldable material into said tool to form a formed product; and
ejecting said formed product from said tool using compressed air.

16. A method of forming moldable material, comprising:
providing a tool according to claim 8;
pressing a moldable material into said tool to form a formed product; and
ejecting said formed product from said tool using compressed air.

* * * * *